(12) United States Patent
Porter et al.

(10) Patent No.: US 10,246,648 B2
(45) Date of Patent: Apr. 2, 2019

(54) PROCESS FOR MANAGING SULPHUR SPECIES

(71) Applicant: CES TECHNOLOGY S.À.R.L., Luxembourg (LU)

(72) Inventors: Terry Porter, Delta (CA); Bryan Sih, Delta (CA)

(73) Assignee: CES TECHNOLOGY S.À.R.L., Luxembourg (LU)

( * ) Notice: Subject to any disclaimer, the term of this patent is extended or adjusted under 35 U.S.C. 154(b) by 0 days.

(21) Appl. No.: 15/527,416

(22) PCT Filed: Jun. 17, 2016

(86) PCT No.: PCT/IB2016/053627
§ 371 (c)(1),
(2) Date: May 17, 2017

(87) PCT Pub. No.: WO2016/203449
PCT Pub. Date: Dec. 22, 2016

(65) Prior Publication Data
US 2018/0105753 A1 Apr. 19, 2018

Related U.S. Application Data

(60) Provisional application No. 62/181,023, filed on Jun. 17, 2015.

(51) Int. Cl.
*C10G 27/02* (2006.01)
*B01J 27/06* (2006.01)
*C10G 27/12* (2006.01)

(52) U.S. Cl.
CPC .............. *C10G 27/02* (2013.01); *C10G 27/12* (2013.01); *B01D 2257/30* (2013.01); *B01J 27/06* (2013.01); *C10G 2300/202* (2013.01)

(58) Field of Classification Search
CPC ....... C10G 27/02; B01D 2257/30; B01J 27/06
See application file for complete search history.

(56) References Cited

U.S. PATENT DOCUMENTS

| | | | |
|---|---|---|---|
| 3,954,800 A * | 5/1976 | Lowe | C07C 319/24 549/20 |
| 4,070,271 A * | 1/1978 | Carlson | C10G 53/14 208/206 |
| 4,224,139 A | 9/1980 | Schiff | |
| 4,476,010 A | 10/1984 | Bouk | |
| 4,990,675 A * | 2/1991 | Sauerbier | C07C 319/24 568/22 |
| 8,828,351 B2 | 9/2014 | Felch et al. | |
| 2002/0148756 A1 | 10/2002 | Morris et al. | |
| 2010/0300938 A1* | 12/2010 | Martinie | C10G 27/00 208/236 |
| 2011/0031164 A1 | 2/2011 | Litz et al. | |
| 2014/0374104 A1* | 12/2014 | Seth | C02F 1/725 166/305.1 |

FOREIGN PATENT DOCUMENTS

NL 8104616 A 5/1983

OTHER PUBLICATIONS

International Search Report and Written Opinion corresponding to PCT/IB2016/053627 dated Sep. 21, 2016; 11 pages.
Kirihara, Masayuki et al., "A Mild and Environmentally Benign Oxidation of Thiols to Disulfides," *Synthesis* (advanced online publication Sep. 21, 2007); 21:3286-3289.

* cited by examiner

*Primary Examiner* — Randy Boyer
(74) *Attorney, Agent, or Firm* — Mintz, Levin, Cohn, Ferris, Glovsky and Popeo, P.C.

(57) ABSTRACT

This disclosure relates to a method of managing a sulphur-containing species from a sour liquid, the method comprising: providing a sour liquid comprising sulphur-containing species; introducing a halogen-based catalyst to the sour liquid, the halogen-based catalyst being complexed with a second species; introducing an oxidant to the sour liquid; and reacting the sulphur-containing species, the halogen-based catalyst and the oxidant. The second species may be an ethoxylate or propoxylate species. The disclosure also relates to a composition comprising a sour liquid, a hydrogen-based catalyst complexed with a second species, and an oxidant, a use of a halogen-based catalyst that is complexed with a second species for the treatment of a sulphur-containing species in a sour liquid, and a composition containing a halogen-based catalyst that is complexed with a second species in a suitable carrier for use in the treatment of a sulphur-containing species in a sour liquid.

20 Claims, 2 Drawing Sheets

PROCESS FOR MANAGING SULPHUR SPECIES

TECHNICAL FIELD

The present disclosure relates to a process for managing sulphur species in liquids. The present disclosure further relates to compositions, systems, apparatuses, and the like, for managing sulphur species.

BACKGROUND

Crude petroleum oil and other liquids often contain sulphur compounds such as, but not limited to, hydrogen sulphide, mercaptans, thioethers, disulphides, thiophenes, cyclic polymethylene sulphides, and the like. Volatile sulphur species dissolved in the liquids often render the liquids highly toxic and highly odorous. As such, crude petroleum oils and other liquids containing such volatile sulphur species are often difficult or dangerous to handle, transport and store.

Because of their volatility, sulphur species typically collect in the headspace of the oil/liquid storage/transport systems. Direct contact with crude petroleum oil and other liquids containing sulphuric compounds may also be hazardous, as such sulphuric compounds may be absorbed directly from the fluids. Limiting exposure to these chemical compounds during handling is desirable.

There are various techniques used in petroleum refining to remove hydrogen sulphides and mercaptans from organic media. For example, sulphuric species may be removed from crude oil and its derivatives by catalytic hydro-desulfurization or catalytic oxidative desulfurization. However, such removal processes require large industrial installations in order to be employed. In other examples, amine-based scavengers have also been used to manage sulphuric species in organic media. However, such scavengers form by-products that may cause problems in downfield applications of the treated media, such as, but not limited to, oil reforming where reformer catalysts are sensitive to nitrogen content. In addition, amines in crude oil have also been known to distill in crude towers and overhead condensing systems, contributing to salt fouling and related corrosion activity.

Some commercial products only focus on the removal of dissolved hydrogen sulphide content of crude oils and hydrogen sulphide gas present in liquid overheads. As such, these untreated or partially treated liquids often continue to contain other noxious sulphur-containing species (e.g. mercaptans) that have considerable objectionable odours. As sulphur-containing species sometimes have the same or similar odour, odours resulting from the volatilization of other noxious sulphur-containing species may mask the presence of un-removed hydrogen sulphide (which is similarly odorous), thereby leading to potential detrimental effects. Without the aid of chemical testing, it would be difficult to determine if a liquid contaminated with noxious sulphur-containing species (e.g. mercaptans) is also contaminated with the considerably more dangerous hydrogen sulphide.

Mercaptan species may be oxidized by iodine in solution (Kirihara et al. Synthesis, 2007, 21:3286). In addition, iodine may aid in the management of certain sulphur-containing species (e.g. NL 8104616; U.S. Pat. No. 4,224,139). However, iodine is a solid with poor handling and dissolution properties in both oil and water, sublimes at room temperature, and can be hazardous under certain conditions. Most solvents for iodine are volatile alcohols that are flammable, and certain solvents would be susceptible to oxidative attack by the oxidizing agent used.

SUMMARY

This present disclosure relates to a process for managing sulphur species in liquids. The present disclosure further relates to compositions, systems, apparatuses, and the like, for managing sulphur species.

According to an aspect of the disclosure there is a method of removing a sulphur-containing species from a sour liquid, said method comprising: (a) providing a sour liquid comprising sulphur-containing species; (b) introducing a halogen-based catalyst to the sour liquid, the halogen-based catalyst being complexed with a second species; (c) introducing an oxidant to the sour liquid; and (d) reacting the sulphur-containing species, the halogen-based catalyst and the oxidant.

The method may further comprise introducing a surfactant, such as an ethoxylated surfactant, a propoxylated surfactant, sorbitan oleate, or any combination thereof, to the sour liquid to control the hydrophilic-lipophilic balance of the sour liquid.

The sulphur-containing species may be a thiol species such as hydrogen sulphide, an alkyl-thiol, an aryl-thiol, a substituted-alkyl-thiol, or a substituted-aryl-thiol. The second species may be an ethoxylate or propoxylate species, and the oxidant may be a peroxide.

According to another aspect of the disclosure, there is a composition comprising a sour liquid, a hydrogen-based catalyst complexed with a second species, and an oxidant.

According to another aspect of the disclosure, there is a composition containing a halogen-based catalyst that is complexed with a second species in a suitable carrier for use in the treatment of a sulphur-containing species in a sour liquid. The halogen-based catalyst may be an iodine-based catalyst.

According to another aspect of the disclosure, there is a use of a halogen-based catalyst that is complexed with a second species for the treatment of a sulphur-containing species in a sour liquid.

This summary does not necessarily describe all features of the invention. Other aspects, features and advantages of the invention will be apparent to those of ordinary skill in the art upon review of the following description of specific embodiments of the invention.

BRIEF DESCRIPTION OF THE DRAWINGS

These and other features of the invention will become more apparent from the following description in which reference is made to the appended drawings wherein.

DETAILED DESCRIPTION

Figure 1A:
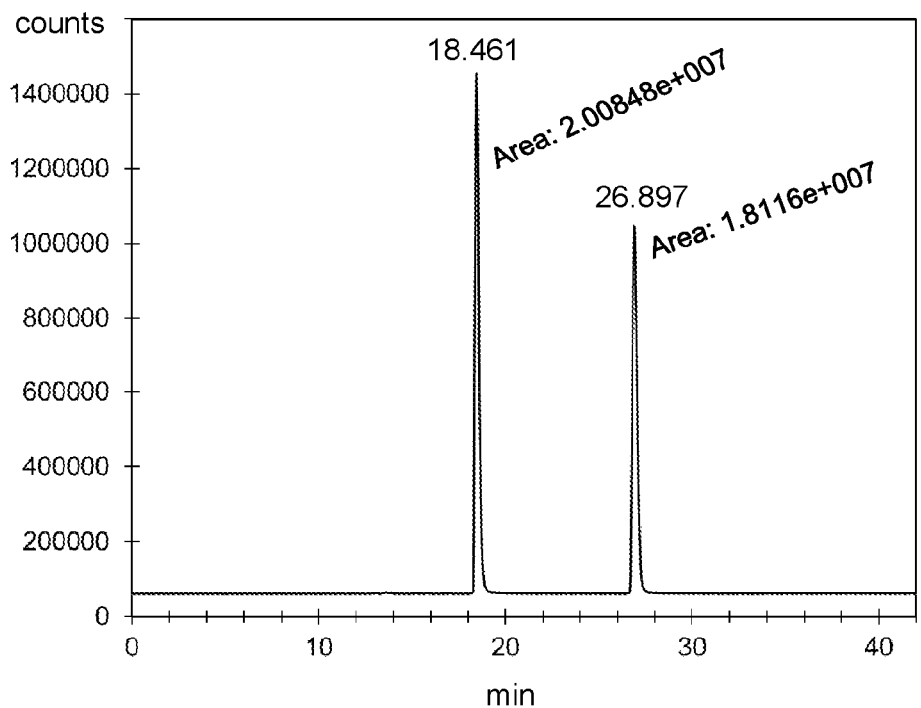
FIG. 1(a) shows a GC-FPD chromatograph of high boiling point petroleum ether spiked with 10,000 ppm of 1-butanethiol and cyclohexanethiol before treatment.

As used herein, directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

As used herein, the term "about" means within 10% of the stated value. It is to be understood that such a variation is always included in any given value provided herein, whether or not it is specifically referred to.

As used herein, "catalyst" refers to a compound that increases the reaction rate of an oxidation reaction.

As used herein, "oxidizing agent" or "oxidant" means any suitable substance that can oxidize a spent catalyst.

As used herein, the term "sour liquid" means a substance that is liquid (e.g. aqueous or oil) during treatment and contains a sulphur-containing species.

The present disclosure relates to a process for managing sulphur species in liquid samples. Any suitable liquid sample may be treated including, but not limited to, crude oil, petrol, light and heavy naptha, kerosene, diesel, lubricating oil, fuel oil, recycled oil, tire derived fuel, or aqueous solutions used in the treatment of gaseous, liquid and solid fuels.

A sulphur-containing liquid sample is treated with a catalyst and an oxidizing agent. Suitable catalysts include halogen-based catalysts such as, but not limited to, those comprising bromine or iodine. Halogen-based catalysts refer to any one of their various forms. Using iodine-based catalysts as an example, the catalyst may refer to, for example, elemental iodine ($I_2$), iodide ion ($I^-$), triiodide ion ($I_3^-$), iodate ion ($IO_3^-$), or an active iodine cationic species (HOI) which is formed when $I^-$ reacts with a peroxide.

While not wishing to be bound by theory, it is believed that the catalyst (e.g. $I_2$) oxidizes: (i) sulphur-containing species, such as but not limited to mercaptans, to disulphides; and (ii) $H_2S$ to sulphur. The oxidizing agent then oxidizes the spent form of the catalyst (e.g. $I^-$) and regenerates the catalyst (e.g. $I_2$). The oxidizing agent is used in stoichiometric amounts relative to the sulphur species while the iodine is used in catalytic amounts and is not consumed in the reaction. Such oxidization of sulphur-containing species in liquid samples makes the liquid samples safer for handling, transportation and storage. The oxidation reaction of sulphur-containing species in a liquid sample is depicted in Scheme 1 below:

Scheme 1. Equation for Thiol Oxidation

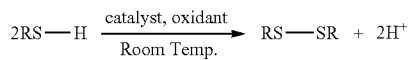

$$2RS-H \xrightarrow[\text{Room Temp.}]{\text{catalyst, oxidant}} RS-SR + 2H^+$$

It is noted that "R" may be H, an alkyl group, an aryl group, a substituted-alkyl group or a substituted-aryl group.

Any suitable concentration of catalyst may be used. Using elemental iodine as an example, the resulting concentration of $I_2$ in a liquid sample being treated may be about 0.1 ppm or greater, about 5 ppm or greater, about 10 ppm or greater. In other examples, the resulting concentration of $I_2$ in the liquid sample being treated may be about 10,000 ppm or less, about 5,000 ppm or less, about 1,000 ppm or less, about 100 ppm or less.

In some embodiments, the catalyst is pre-dissolved in a solvent to achieve better mixing with the liquid sample being treated. Using an iodine catalyst as an example, iodine may be complexed in a carrier solvent such as an ethoxylate such as, but not limited to, alcohol ethoxylates, polyethylene glycol propylene oxide copolymer, and the like. Any suitable amount of iodine may be complexed in the ethoxylate. For example, about 0.1 wt % or more, about 5 wt % or more, about 10 wt % or more, about 14 wt % or more, about 18 wt % or more, of iodine may be complexed in the ethoxylate. In other examples, about 30 wt % or less, about 28 wt %, about 26 wt % or less, of iodine may be complexed in the ethoxylate. Complexed iodine reduces the loss of iodine through sublimation, thereby assisting to keep the iodine in solution. Complexed iodine solutions may be pre-made and simply added to the sour liquid when appropriate. For example, the solution may be added to crude oil that is ready for transportation. In other embodiments, the catalyst is not dissolved in a solvent.

Any suitable oxidant may be employed, such as those that can regenerate a catalyst from a spent catalyst (e.g. $I^-$ to $I_2$). For example, the oxidant may be a peroxide such as, but not limited to, t-butyl hydroperoxide, cumene hydroperoxide, hydrogen peroxide, and the like. The peroxide may be selected depending on the miscibility of the peroxide in the sample being treated. In some embodiments, and when the sample being treated is an aqueous sample, hydrogen peroxide as the oxidant is preferred. In some embodiments, the peroxide is dissolved in a solvent to achieve better mixing with non-polar samples. For example, the peroxide may be dissolved in a liquid solvent such as, but not limited to, decane or cumene. The concentration of peroxide in the solvent may be any suitable concentration such as, but not limited to, from about 0.1M to about 20M, about 5M to about 8M, about 5M to about 6M.

Surfactants may also be employed (e.g. ethoxylated surfactants, sorbitan oleate, and the like) to adjust the hydrophilic-lipophilic balance (HLB) of the sour liquid being treated. For example, adding aqueous hydrogen peroxide to the sour liquid may at times create a water-in-oil emulsion. In such an example, it is believed that the surfactant increases the surface contact of the polar hydrogen peroxide, the catalyst (e.g. iodine) and the sulphur species being treated thereby increasing the rate of reaction. The mole ratio of peroxide to total sulfur species (e.g. mercaptan+ $H_2S$) may be, but is not limited to, about 0.5-10:1, about 0.8-2:1, or about 0.9-1.1:1.

The ratio of the catalyst to the oxidizing agent may be controlled. For example, using an iodine catalyst as an example, a two pump system may be employed to dispense both iodine and oxidizing agent into the sour liquid. In other examples, the oxidizing agent and the catalyst may be dispensed by a single addition of a formulated product that contains both the oxidizing agent and iodine in an appropriate ratio (e.g. 1 mole % iodine).

Catalytic amounts of the catalyst (e.g. $I_2$), that is as low as 1 mol. % of the total sulphur containing species (e.g. mercaptan and $H_2S$ species) present, may be used. Using an iodine catalyst as an example, the iodine (e.g. $I_2$) may be present in amounts of about 10 mol. % or less, about 8 mol. % or less, about 6 mol. % or less, about 4 mol. % or less, about 2 mol. % or less of the total sulphur containing species present.

Once the catalyst and oxidant have been added to the sample to be treated, the mixture may be aged for a suitable length of time. For example, the mixture of catalyst (e.g. iodine), oxidant and sample may be aged for about 0.1 hours or more, about 1 hr or more, about 2 hours or more, about 4 hours or more. In other examples, the mixture of catalyst (e.g. iodine), peroxide and sample may be aged for about 48 hours or less, about 40 hours or less, about 36 hours or less, about 24 hours or less, about 12 hours or less. The mixture may be at any suitable temperature such as between about 5-100° C., between about 10-70° C., between about 20-50° C.

After treatment, the sample may be assessed for sulphur content by a suitable analytical instrument and detector such as, for example, a gas chromatograph (GC) with a flame photometric detector equipped with a sulphur filter. The treated samples preferably have a level of active sulphur species of about 100 ppm or less, about 50 ppm or less, about 10 ppm or less, about 1 ppm or less.

Varying the HLB of the complexing agent used on the catalyst can modulate the dispersity of the disulphides formed in the medium being treated. In some embodiments, a complexing agent could be used to cause at least some of the disulphides produced to separate out of solution. A skilled person in the art may then remove the disulphides, for example, en route to a refinery or a storage system. In other embodiments, a complexing agent could be used to improve the solubility of disulphides in the sour liquid being treated and keep the disulphides in solution.

The present disclosure also provides a liquid composition comprising a sour liquid, an oxidant, and a catalyst as described herein.

The present disclosure also provides a composition comprising an oxidant and a catalyst as described herein. The composition may be used to manage sulphur species in sour liquids.

The present disclosure also provides the use of a peroxide dissolved in a liquid solvent for managing sulphur in a liquid. The present disclosure provides the use of iodine complexed in a carrier such as ethoxylate for managing sulphur in a liquid.

It is contemplated that the different parts of the present description may be combined in any suitable manner. For instance, the present examples, methods, aspects, embodiments or the like may be suitably implemented or combined with any other embodiment, method, example or aspect of the invention.

Unless defined otherwise, all technical and scientific terms used herein have the same meaning as is commonly understood by one of ordinary skill in the art to which this invention belongs. Unless otherwise specified, all patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference. Citation of references herein is not to be construed nor considered as an admission that such references are prior art to the present invention.

Use of examples in the specification, including examples of terms, is for illustrative purposes only and is not intended to limit the scope and meaning of the embodiments of the invention herein. Numeric ranges are inclusive of the numbers defining the range. The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

EXAMPLES

Samples were analyzed for mercaptan and disulphide content using an HP 5890 series II plus GC-FPD with a sulphur filter. A Restek 502.2 fused silica column with a diphenyl/dimethyl polysiloxane stationary phase (40 m×0.18 mm ID) was used with a split injector and detector both set to 260° C. The column had an initial temperature of 40° C. The temperature of the column was increased by 10° C./min until 240° C. and held at 240° C. for 60 minutes.

Example 1

10 grams of high boiling point petroleum ether (BP=60-80° C.) was spiked with 10,000 ppm of 1-butanethiol and cyclohexanethiol to simulate a sample of sour gas condensate. 30 mg of Halophor-SH (25 wt % $I_2$ complexed with ethoxylated and/or propoxylated surfactant) was added to the simulated sample of sour gas condensate and mixed vigorously until homogenous. 450 µl of 5 M t-butyl hydroperoxide in decane was then added to the sour liquid, mixed and allowed to stand for 1 hour at room temperature. After 1 hour, a sample was analyzed by GC-FPD and the results were compared to a sample of the sour gas condensate that was analyzed prior to treatment.

Prior to treatment, and as depicted in FIG. 1(*a*), the sour gas condensate contained at least two thiol-compounds: 1-butanethiol (elution time=18.5 mins) and cyclohexanethiol (elution time=26.9 mins).

Figure 1B:
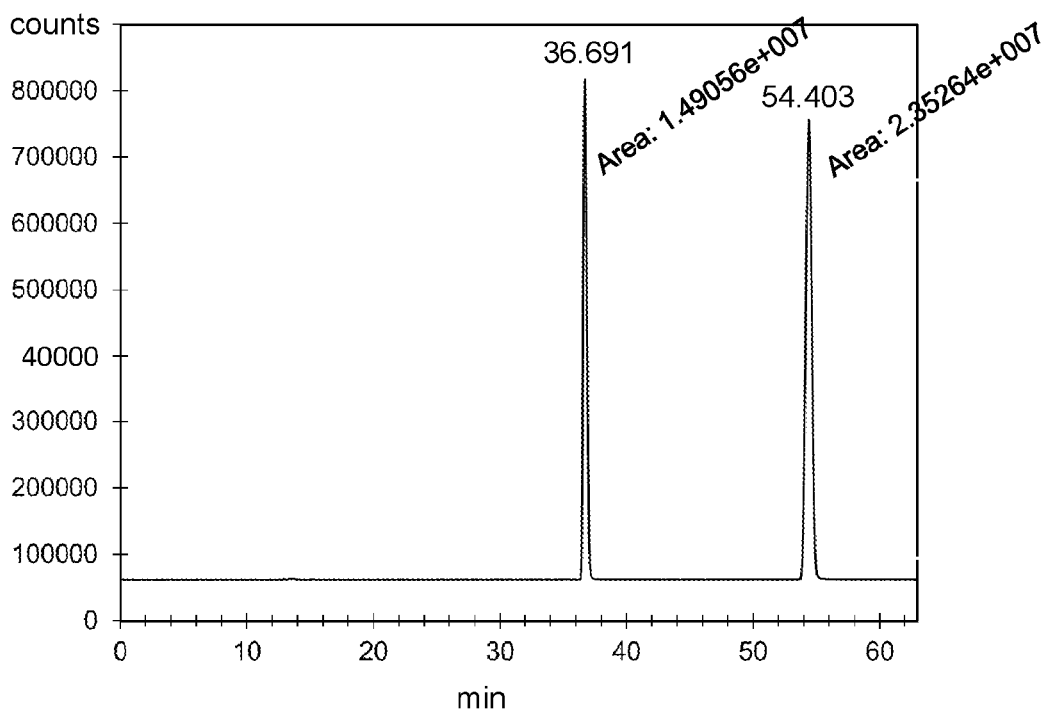
FIG. 1(b) shows a GC-FPD chromatograph of high boiling point petroleum ether spiked with 10,000 ppm of 1-butanethiol and cyclohexanethiol after treatment with Halophor-SH and t-butyl hydroperoxide and aged for 1 hour at room temperature.

After treatment of the sour gas condensate, and as depicted in FIG. 1(*b*), neither 1-butanethiol nor cyclohexanethiol was detected in the sour gas condensate. Instead, previously undetected dithiol-compounds of dibutyldisulphide (elution time=36.7 mins) and cyclohexyl butyldisulphide (elution time=54.4 mins) were detected, dibutyldisulphide and cyclohexyl butyldisulphide both being higher molecular weight disulphides that have higher boiling points than 1-butanethiol and cyclohexanethiol. A third thiol-product, dicyclohexyldisulphide, was also eluted and detected, but at a much broader peak and at greater than 65 minutes elution time. The elution spectrum of dicyclohexyldisulphide is therefore not shown in FIG. 1(b). The smell of the simulated sour gas condensate was also greatly improved from a strong foul rotten egg smell to one that smelled of petroleum ether after treatment.

Example 2

10 grams of high boiling point petroleum ether (BP=60-80° C.) was spiked with 10,000 ppm of 1-butanethiol and cyclohexanethiol to simulate a sample of sour gas condensate. 30 mg of Halophor-SH was added to the simulated sample of sour gas condensate and mixed vigorously until homogenous. 420 µl of cumene hydroperoxide (80%) in cumene is then added to the mixture, mixed and allowed to stand for 1 hour at room temperature.

After 1 hour post-treatment, the treated mixture was sampled by GC-FPD and approximately 200 ppm of mercaptan were determined to be remaining.

After 2.5 hours post-treatment, no mercaptan was detectable by GC-FPD. The smell of the simulated sour gas condensate was also greatly improved from a strong foul rotten egg smell to one that smells simply of petroleum ether 2.5 hours after treatment.

Example 3

Petsol-12 (a field soul gas condensate), containing about 1250 ppm of mercaptans, was acquired from Canadian Energy Services. 20 mg of Halophor-SH was added to the Petsol-12 and mixed vigorously until homogenous. 150 µl of 80% cumene hydroperoxide in cumene was then added to the Petsol-12, mixed and allowed to stand for 1 hour at room temperature. After 1 hour, a sample was analyzed by GC-FPD and the results were compared to a sample analyzed prior to treatment.

After 1 hour post-treatment, the mixture was sampled by GC-FPD and approximately 200 ppm of mercaptan were determined to be remaining.

After 3 hours post-treatment, no mercaptan was detectable by GC-FPD. The smell of the sour gas condensate was also greatly improved from a strong foul rotten egg smell to one that smells of petroleum products.

Example 4

Petsol-12 (a field soul gas condensate), containing about 1250 ppm of mercaptans, was acquired from Canadian Energy Services. 20 mg of Halophor-SH was added to the Petsol-12 and mixed vigorously until homogenous. 150 µl of 80% cumene hydroperoxide in cumene was then added to the Petsol-12, mixed and allowed to stand for 1 hour at 45° C. After 1 hour, a sample was analyzed by GC-FPD and the results were compared to a sample analyzed prior to treatment.

After 1 hour post-treatment, the mixture was sampled for GC-FPD and no mercaptan was detectable by GC-FPD. The smell of the sour gas condensate was also greatly improved from a strong foul rotten egg smell to one that smells of petroleum products.

Example 5

Figure 2A:
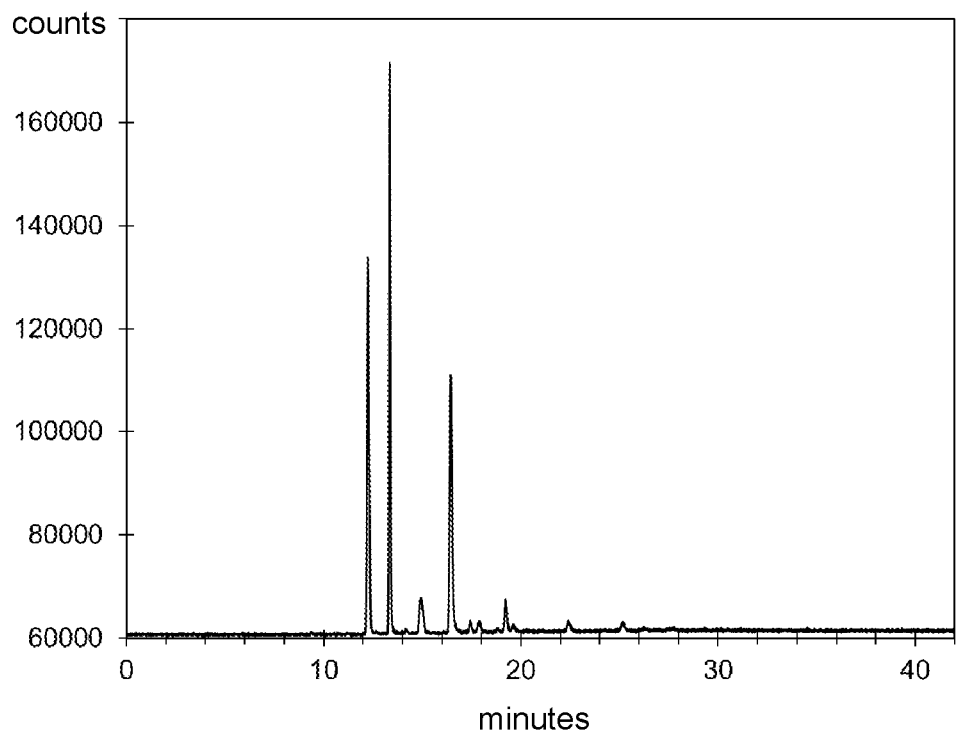
FIG. 2(a) shows a GC-FPD chromatograph of real field sour gas condensate (Storm condensate acquired from Purechem services) which contains 7,500-10,000 ppm of mercaptans before treatment.

Storm condensate (a field sour gas condensate), containing about 7,500 to 10,000 ppm mercaptan, was acquired from Purechem Services. Prior to treatment, and as depicted in FIG. 2(a), Storm condensate contained a plurality of thiol compounds, the most prominent of which were eluted between 10 and 20 minutes of analysis.

Figure 2B:
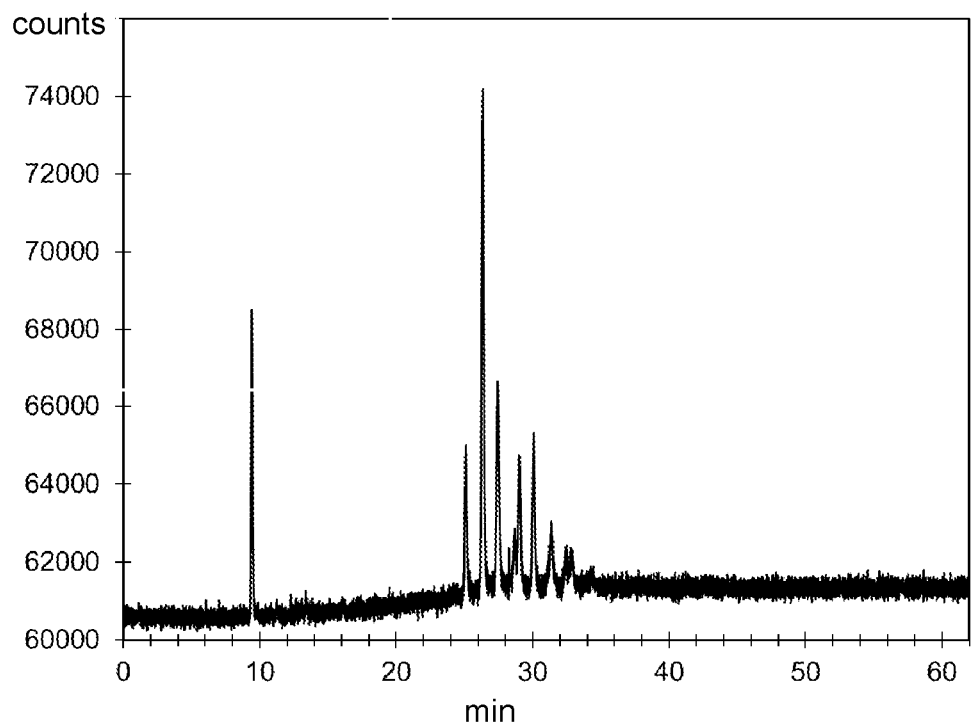
FIG. 2(b) shows a GC-FPD chromatograph of real field sour gas condensate (Storm condensate acquired from Purechem services) which contains 7,500-10,000 ppm of mercaptans after treatment with Halophor-SH and cumene hydroperoxide and aged for 1 hour at 45° C.

30 mg of Halophor-SH were added to the Storm condensate and mixed vigorously until homogenous. 1 ml of 80% cumene hydroperoxide in cumene was then added to the Storm condensate, mixed, and allowed to stand for 1 hour at 45° C. After 1 hour, a sample was analyzed by GC-FPD and the results (as depicted in FIG. 2(b)) were compared to a sample analyzed prior to treatment (as depicted in FIG. 2(a)).

After 1 hour post-treatment, the thiol compounds detected prior to treatment (i.e. those that were eluted between 10 and 20 minutes of analysis) were no longer detected. New peaks on the GC-FPD spectrum appeared at longer elution times, suggesting the formation of higher molecular weight disulphides having much higher boiling points. The smell of the field sour gas condensate was also greatly improved from a strong foul rotten egg smell to one that smells of petroleum products.

What is claimed is:

1. A method of removing a sulphur-containing species from a sour liquid, said method comprising:
    (a) providing the sour liquid comprising the sulphur-containing species;
    (b) introducing a halogen-based catalyst to the sour liquid, wherein the halogen-based catalyst is complexed with a second species selected from the group consisting of an ethoxylate species, a propoxylate species, and a combination thereof;
    (c) introducing an oxidant to the sour liquid; and
    (d) reacting the sulphur-containing species, the halogen-based catalyst and the oxidant.

2. The method of claim 1, further comprising introducing a surfactant to the sour liquid to control the hydrophilic-lipophilic balance of the sour liquid.

3. The method of claim 1, wherein the sulphur-containing species is a thiol species.

4. The method of claim 1, wherein the sulphur-containing species is hydrogen sulphide, an alkyl-thiol, an aryl-thiol, a substituted-alkyl-thiol, or a substituted-aryl-thiol.

5. The method of claim 1, wherein the oxidant is a peroxide.

6. The method of claim 1, further comprising forming a disulphide product.

7. The method of claim 1, wherein the halogen-based catalyst oxidises the sulphur-containing species to form a spent catalyst, and wherein the oxidant oxidises the spent catalyst to regenerate the halogen-based catalyst.

8. The method of claim 1, wherein the halogen-based catalyst is an iodine-based catalyst.

9. A composition comprising a sour liquid, a halogen-based catalyst complexed with a second species, and an oxidant, wherein the second species is an ethoxylate species, a propoxylate species, or a combination thereof.

10. The composition of claim 9, further comprising a surfactant.

11. The composition of claim 10, wherein the surfactant is an ethoxylated surfactant, a propoxylated surfactant, sorbitan oleate, or any combination thereof.

12. The composition of claim 9, wherein the halogen-based catalyst is an iodine-based catalyst.

13. The composition of claim 9, wherein the oxidant is a peroxide.

14. The composition of claim 13, wherein the peroxide is hydrogen peroxide, t-butyl hydroperoxide or cumene hydroperoxide.

15. The composition of claim 12, wherein the iodine-based catalyst is $I_2$.

16. The method of claim 8, wherein the iodine-based catalyst is $I_2$.

17. The composition of claim 9, wherein the second species is the propoxylate species.

18. The composition of claim 9, further comprising a surfactant, wherein the halogen-based catalyst is an iodine-based catalyst, and the oxidant is a peroxide.

19. A method of removing a sulphur-containing species from a sour liquid, said method comprising:
   (a) providing the sour liquid comprising the sulphur-containing species, wherein the sulphur-containing species is hydrogen sulphide, an alkyl-thiol, an aryl-thiol, a substituted-alkyl-thiol, or a substituted-aryl-thiol;
   (b) introducing a halogen-based catalyst to the sour liquid, wherein the halogen-based catalyst is complexed with a second species selected from the group consisting of an ethoxylate species, a propoxylate species, and a combination thereof;
   (c) introducing an oxidant to the sour liquid, wherein the oxidant is a peroxide;
   (d) reacting the sulphur-containing species, the halogen-based catalyst and the oxidant, thereby forming a disulphide product, wherein the halogen-based catalyst oxidizes the sulphur-containing species to form a spent catalyst, and wherein the oxidant oxidizes the spent catalyst to regenerate the halogen-based catalyst; and
   (e) introducing a surfactant to the sour liquid to control the hydrophilic-lipophilic balance of the sour liquid.

20. The method of claim 19, wherein the halogen-based catalyst is an iodine-based catalyst.

* * * * *